United States Patent
Tan et al.

(10) Patent No.: US 12,013,798 B2
(45) Date of Patent: Jun. 18, 2024

(54) METHOD OF DATA SYNCHRONIZATION AND REDUNDANT SERVER SYSTEM

(71) Applicant: Mitac Computing Technology Corporation, Taoyuan (TW)

(72) Inventors: Chin-Hung Tan, Taoyuan (TW); Heng-Chia Hsu, Taoyuan (TW); Chien-Chung Wang, Taoyuan (TW); Yu-Shu Yeh, Taoyuan (TW); Chen-Yin Lin, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 0 days.

(21) Appl. No.: 18/052,559

(22) Filed: Nov. 3, 2022

(65) Prior Publication Data

US 2023/0153255 A1 May 18, 2023

(30) Foreign Application Priority Data

Nov. 10, 2021 (TW) .................................. 110141801

(51) Int. Cl.
*G06F 9/445* (2018.01)
*G06F 13/16* (2006.01)

(52) U.S. Cl.
CPC ...... *G06F 13/1668* (2013.01); *G06F 9/44505* (2013.01); *G06F 2213/0016* (2013.01)

(58) Field of Classification Search
None
See application file for complete search history.

(56) References Cited

U.S. PATENT DOCUMENTS

| | | | |
|---|---|---|---|
| 5,923,830 A * | 7/1999 | Fuchs | G06F 11/1641 714/11 |
| 6,449,732 B1 * | 9/2002 | Rasmussen | H04L 1/22 713/400 |
| 2020/0250171 A1 * | 8/2020 | Yin | G06F 16/2365 |

* cited by examiner

*Primary Examiner* — Farley Abad
*Assistant Examiner* — Dayton Lewis-Taylor
(74) *Attorney, Agent, or Firm* — 504034

(57) ABSTRACT

A method of data synchronization is to be implemented by a redundant server system including an active input/output module (IOM) and a passive IOM. The method includes: allocating a primary transfer buffer in the active IOM; allocating a secondary transfer buffer in the passive IOM; collecting pieces of secondary dedicated-sensor data, and storing the pieces of secondary dedicated-sensor data in the primary transfer buffer at once; collecting pieces of primary dedicated-sensor data; after the pieces of primary dedicated-sensor data have been collected, updating the primary state data based on the pieces of primary dedicated-sensor data thus collected and the pieces of secondary dedicated-sensor data stored in the primary transfer buffer at once, and storing the primary state data thus updated in the secondary transfer buffer; and updating the secondary state data based on the primary state data that have been updated and that are stored in the secondary transfer buffer.

14 Claims, 2 Drawing Sheets

METHOD OF DATA SYNCHRONIZATION AND REDUNDANT SERVER SYSTEM

CROSS-REFERENCE TO RELATED APPLICATION

This application claims priority to Taiwanese Invention Patent Application No. 110141801, filed on Nov. 10, 2021.

FIELD

The disclosure relates to a method of data synchronization and a redundant server system, and more particularly to a method of data synchronization utilized in a redundant server system.

BACKGROUND

A redundant server system includes an active input/output module (IOM) and a passive IOM. Each of the active IOM and the passive IOM includes a plurality of sensors such as a temperature sensor, a voltage detector, a current detector or the like. Each of the sensors generates a piece of sensor data for each detection, and a corresponding one of the active IOM and the passive IOM collects, via an inter-integrated circuit (I2C) interface, sensor data detected by the sensor. The sensor data thus collected are then stored as files in a file system in a user space layer of an operating system (OS) of the redundant server system. In a conventional approach of data synchronization between the active IOM and the passive IOM, each piece of the sensor data collected by one of the active IOM and the passive IOM is individually transmitted (i.e., is not transmitted together with another piece of the sensor data) to the other one of the active IOM and the passive IOM. However, such approach is time consuming and is prone to data loss during transmission.

SUMMARY

Therefore, an object of the disclosure is to provide a method of data synchronization and a redundant server system that can alleviate at least one of the drawbacks of the prior art.

According to one aspect of the disclosure, the method is to be implemented by a redundant server system. The redundant server system includes an active input/output module (IOM) and a passive IOM. The active IOM includes a primary processing unit and at least one primary dedicated sensor that are electrically connected to each other. The primary processing unit includes a primary memory device. The passive IOM includes a secondary processing unit and at least one secondary dedicated sensor that are electrically connected to each other. The secondary processing unit is electrically connected to the primary processing unit of the active IOM, and includes a secondary memory device. The primary memory device stores primary state data that include data detected by all of the at least one primary dedicated sensor and the at least one secondary dedicated sensor. The secondary memory device stores secondary state data that include data detected by all of the at least one primary dedicated sensor and the at least one secondary dedicated sensor. The method includes steps of:

allocating, by the primary processing unit, a primary transfer buffer in the primary memory device;
allocating, by the secondary processing unit, a secondary transfer buffer in the secondary memory device, a format of the secondary transfer buffer being identical to that of the primary transfer buffer;
by the secondary processing unit, collecting a plurality of pieces of secondary dedicated-sensor data that are numerical values detected by the at least one secondary dedicated sensor, and storing the pieces of secondary dedicated-sensor data in the primary transfer buffer of the active IOM at once;
by the primary processing unit, collecting a plurality of pieces of primary dedicated-sensor data that are numerical values detected by the at least one primary dedicated sensor;
after the pieces of primary dedicated-sensor data have been collected, by the primary processing unit, updating the primary state data based on the pieces of primary dedicated-sensor data thus collected and the pieces of secondary dedicated-sensor data stored in the primary transfer buffer at once, and storing the primary state data thus updated in the secondary transfer buffer of the passive IOM; and
updating, by the secondary processing unit, the secondary state data based on the primary state data that have been updated and that are stored in the secondary transfer buffer.

According to another aspect of the disclosure, a redundant server system includes an active input/output module (IOM) and a passive IOM.

The active IOM includes a primary processing unit that includes a primary memory device, and at least one primary dedicated sensor that is electrically connected to the primary processing unit.

The passive IOM includes a secondary processing unit that is electrically connected to the primary processing unit of the active IOM, and that includes a secondary memory device, and at least one secondary dedicated sensor that is electrically connected to the secondary processing unit.

The primary memory device is configured to store primary state data that include data detected by all of the at least one primary dedicated sensor and the at least one secondary dedicated sensor.

The secondary memory device is configured to store secondary state data that include data detected by all of the at least one primary dedicated sensor and the at least one secondary dedicated sensor.

The primary processing unit is configured to allocate a primary transfer buffer in the primary memory device.

The secondary processing unit is configured to allocate a secondary transfer buffer in the secondary memory device. A format of the secondary transfer buffer is identical to that of the primary transfer buffer.

The secondary processing unit is configured to collect a plurality of pieces of secondary dedicated-sensor data that are numerical values detected by the at least one secondary dedicated sensor, and to store the pieces of secondary dedicated-sensor data in the primary transfer buffer of the active IOM at once.

The primary processing unit is configured to collect a plurality of pieces of primary dedicated-sensor data that are numerical values detected by the at least one primary dedicated sensor. After the pieces of primary dedicated-sensor data have been collected, the primary processing unit is configured to update the primary state data based on the pieces of primary dedicated-sensor data thus collected and the pieces of secondary dedicated-sensor data stored in the primary transfer buffer at once. The primary processing unit is configured to store the primary state data thus updated in the secondary transfer buffer of the passive IOM.

The secondary processing unit is configured to update the secondary state data based on the primary state data that have been updated and that are stored in the secondary transfer buffer.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
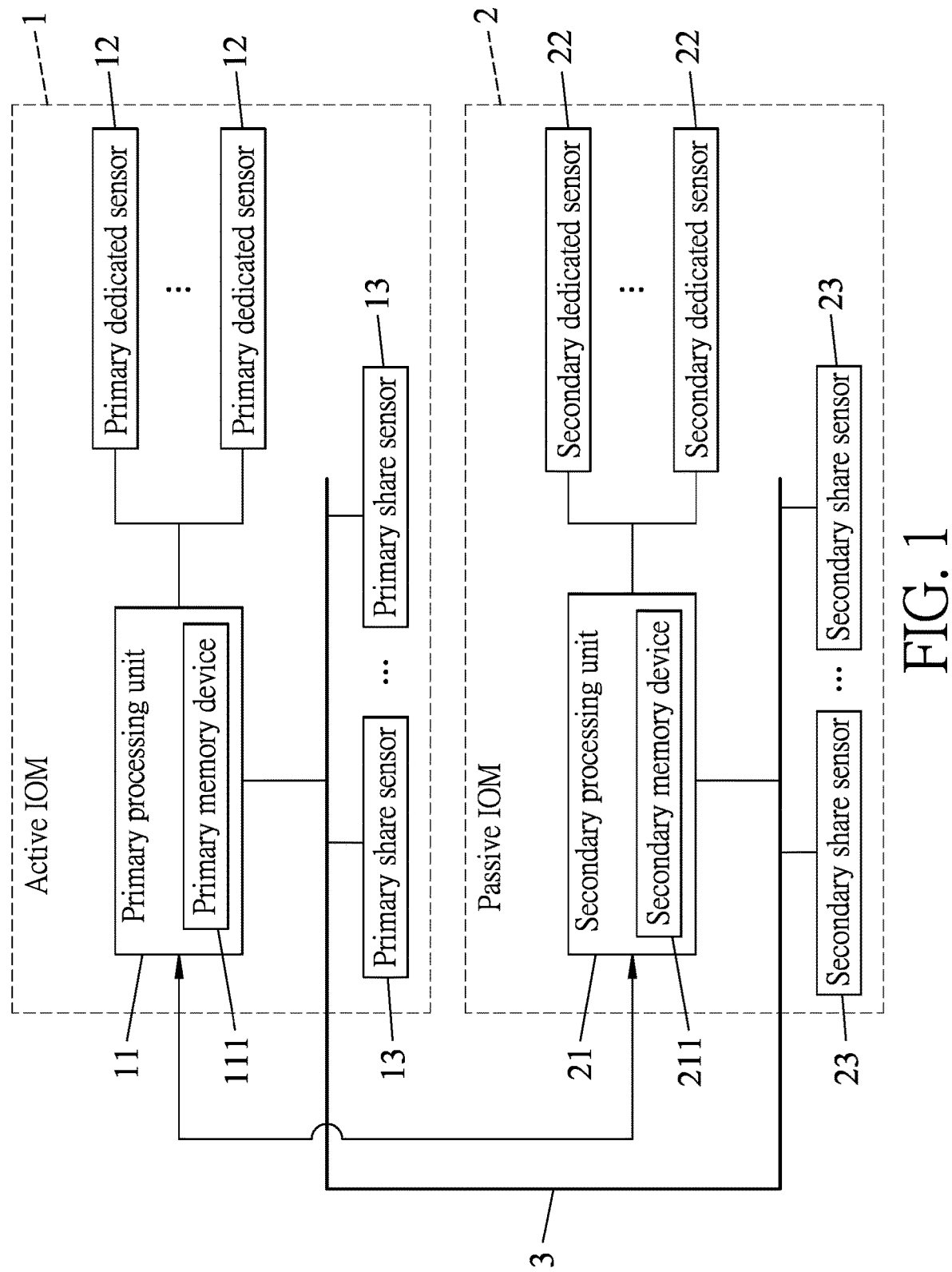
FIG. 1 is a block diagram illustrating an example of a redundant server system according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a redundant server system according to the disclosure is illustrated. The redundant server system includes an active input/output module (IOM) 1, a passive IOM 2 and a share bus 3. The active IOM 1 and the passive IOM 2 serve as redundant IOMs for each other, so as to enhance reliability of the redundant server system together.

The active IOM 1 includes a primary processing unit 11, a plurality of primary dedicated sensors 12 and a plurality of primary share sensors 13. The primary dedicated sensors 12 and the primary share sensors 13 are electrically connected to the primary processing unit 11. The primary processing unit 11 includes a primary memory device 111.

The passive IOM 2 includes a secondary processing unit 21, a plurality of secondary dedicated sensors 22 and a plurality of secondary share sensors 23. The secondary dedicated sensors 22 and the secondary share sensors 23 are electrically connected to the secondary processing unit 21. The secondary processing unit 21 includes a secondary memory device 211. The secondary processing unit 21 is electrically connected to the primary processing unit 11 of the active IOM 1. In this embodiment, the primary processing unit 11 and the secondary processing unit 21 are electrically connected to each other via an inter-integrated circuit (I2C) bus, but is not limited thereto.

The primary processing unit 11, the primary share sensors 13, the secondary processing unit 21 and the secondary share sensors 23 are electrically connected to the share bus 3. It should be noted that the term "share sensor" is referred to as a sensor that is electrically connected to a share bus throughout this disclosure.

In other embodiments, the primary share sensors 13 of the active IOM 1 and the secondary share sensors 23 of the passive IOM 2 may be omitted.

In this embodiment, each of the primary processing unit 11 and the secondary processing unit 21 is implemented by a baseboard management controller (BMC), but is not limited thereto. For example, each of the primary processing unit 11 and the secondary processing unit 21 may be a serial attached small computer system interface (SAS) expander or a redundant array of inexpensive disks (RAID) controller in other embodiments.

Each of the primary memory device 111 and the secondary memory device 211 is a volatile memory and is electrically rewritable. For example, each of the primary memory device 111 and the secondary memory device 211 may be implemented by a random access memory (RAM), a double data rate synchronous dynamic random access memory (DDR SDRAM) or the like, but is not limited thereto.

Each of the primary dedicated sensors 12, the secondary dedicated sensors 22, the primary share sensors 13 and the secondary share sensors 23 may be implemented by a temperature sensor, a voltage detector, a current detector, a tachometer for measuring rotation speed of a fan, or the like, but is not limited to what are disclosed herein and may vary in other embodiments.

The primary memory device 111 is configured to store primary state data that include data detected by all of the primary dedicated sensors 12, the secondary dedicated sensors 22, the primary share sensors 13 and the secondary share sensors 23. The secondary memory device 211 is configured to store secondary state data that include data detected by of all of the primary dedicated sensors 12, the secondary dedicated sensors 22, the primary share sensors 13 and the secondary share sensors 23. In this embodiment, the primary state data and the secondary state data are stored in a system monitor application software that runs in a user space layer of Linux operating system of the redundant server system, but is not limited thereto. It is worth noting that for every round of execution of the system monitor application software, a process of collecting values of all the sensors (i.e., the primary dedicated sensors 12, the secondary dedicated sensors 22, the primary share sensors 13 and the secondary share sensors 23), a status decision algorithm and a "datasync" function are performed. It takes about two to three seconds per round to execute the system monitor application software.

Figure 2:
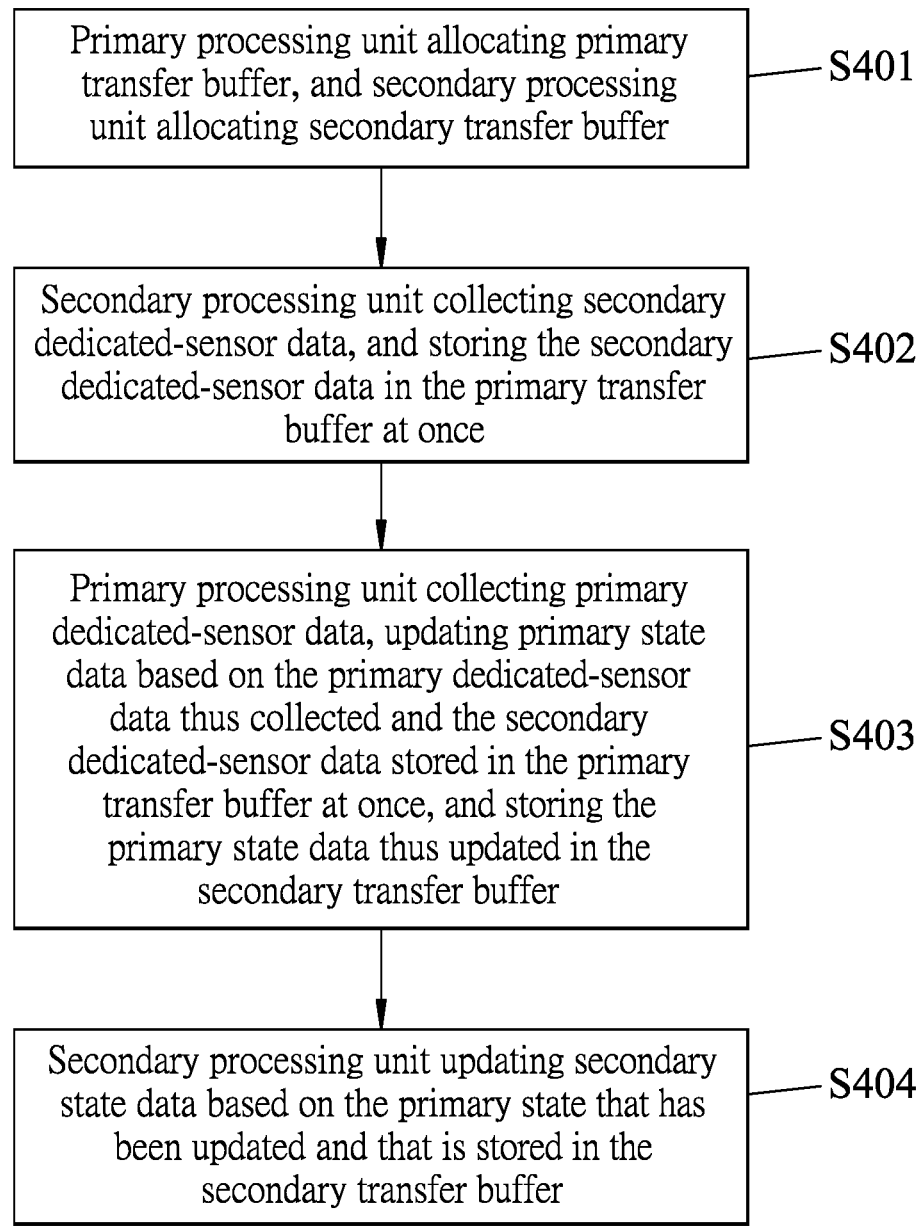
FIG. 2 is a flow chart illustrating an example of a method of data synchronization according to an embodiment of the disclosure.

Referring to FIG. 2, an embodiment of a method of data synchronization according to the disclosure is illustrated. The method is adapted to be implemented by the redundant server system that is previously described. In practice, the method may be incorporated into an enclosure management service (EMS), which is a software tool utilized for managing power, temperature and operation of fans in a hard disc drive (HDD) rack. The method includes steps S401 to S404 that are delineated below.

In step S401, the primary processing unit 11 allocates a primary transfer buffer in the primary memory device 111, and the secondary processing unit 21 allocates a secondary transfer buffer in the secondary memory device 211. In particular, the primary processing unit 11 allocates the primary transfer buffer in a kernel driver layer of the Linux operating system, and the secondary processing unit 21 allocates the secondary transfer buffer in the kernel driver layer of the Linux operating system. Each of the primary buffer and the secondary buffer is a simulated electrically-erasable programmable read-only memory (EEPROM). It is worth noting that a format (also known as a memory layout) of the secondary transfer buffer is identical to that of the primary transfer buffer, and accordingly a certain type of data may be arranged to be stored at an identical location of each of the primary transfer buffer and the secondary transfer buffer.

In step S402, the secondary processing unit 21 collects, at once, a plurality of pieces of secondary dedicated-sensor data that are numerical values detected by the secondary dedicated sensors 22, and stores the pieces of secondary dedicated-sensor data in the primary transfer buffer of the active IOM 1. Specifically, the secondary processing unit 21 packages the pieces of secondary dedicated-sensor data into a single data packet, and stores the data packet in the primary transfer buffer via the I²C bus. It is worth noting that such approach is more efficient than the primary processing unit 11 separately collecting, via the I²C bus, the pieces of secondary dedicated-sensor data.

In step S403, the primary processing unit 11 collects a plurality of pieces of primary dedicated-sensor data that are numerical values detected by the primary dedicated sensors 12, a plurality of pieces of primary share-sensor data that are numerical values detected by the primary share sensors 13, and a plurality of pieces of secondary share-sensor data that are numerical values detected by the secondary share sensor 23. After the pieces of primary dedicated-sensor data, the pieces of primary share-sensor data and the pieces of secondary share-sensor data have been collected, the primary processing unit 11 then updates the primary state data at once based on the pieces of primary dedicated-sensor data, the pieces of primary share-sensor data and the pieces of secondary share-sensor data thus collected, and the pieces of secondary dedicated-sensor data stored in the primary transfer buffer. Next, the primary processing unit 11 stores, via the I²C bus, the primary state data thus updated in the secondary transfer buffer of the passive IOM 2. In some embodiments, the primary processing unit 11 may notify the secondary processing unit 21 that the primary state data have been updated and stored in the secondary transfer buffer.

In step S404, the secondary processing unit 21 updates the secondary state data based on the primary state data that have been updated and that are stored in the secondary transfer buffer.

It should be noted that in step S402, the secondary processing unit 21 collects only the pieces of secondary dedicated-sensor data, and does not collect the pieces of primary dedicated-sensor data. The secondary processing unit 21 may receive data related to the pieces of primary dedicated-sensor data (i.e., the primary state data that have been updated and that are stored in the secondary transfer buffer) after the primary processing unit 11 has collected the pieces of primary dedicated-sensor data, the pieces of primary share-sensor data and the pieces of secondary share-sensor data, and has updated the primary state data in step S403. In this way, the secondary state data may be synchronized to be substantially consistent with the primary state data.

In one embodiment where the at least one primary share sensor 13 of the active IOM 1 is omitted and the at least one secondary share sensor 23 of the passive IOM 2 is omitted, in step S403, the primary processing unit 11 collects the pieces of primary dedicated-sensor data, updates the primary state data based on the pieces of primary dedicated-sensor data thus collected and the pieces of secondary dedicated-sensor data stored in the primary transfer buffer at once, and stores, via the I²C bus, the primary state data thus updated in the secondary transfer buffer.

In sum, for the method of data synchronization and the redundant server system according to the disclosure, the primary processing unit 11 of the active IOM 1 allocates the primary transfer buffer in the primary memory device 111 of the primary processing unit 11, and the secondary processing unit 21 of the passive IOM 2 allocates the secondary transfer buffer in the secondary memory device 211 of the secondary processing unit 21. Thereafter, the secondary processing unit 21 stores the pieces of secondary dedicated-sensor data collected thereby in the primary transfer buffer of the active IOM 1 at once, so as to enable the primary processing unit 11 to update the primary state data based on the pieces of primary dedicated-sensor data collected by the primary processing unit 11 and the pieces of secondary dedicated-sensor data stored in the primary transfer buffer at once. Afterwards, the primary processing unit 11 stores the primary state data that have been updated in the secondary transfer buffer of the passive IOM 2, so as to enable the secondary processing unit 21 to update the secondary state data based on the primary state data that have been updated and that are stored in the secondary transfer buffer. In this way, the primary state data stored in the active IOM 1 and the secondary state data stored in the passive IOM 2 are synchronized. Since data for updating are stored in a volatile memory device (i.e., the pieces of secondary dedicated-sensor data stored in the primary transfer buffer and the primary state data stored in the secondary transfer buffer), accessing the data for updating may be faster than accessing a file in a file system. Moreover, each of the active IOM 1 and the passive IOM 2 transmits a corresponding portion of the data for updating each other in batches (i.e., the secondary processing unit 21 stores the pieces of secondary dedicated-sensor data in the primary transfer buffer at once, and the primary processing unit 11 stores the whole primary state data in the secondary transfer buffer), so a number of times that data is transmitted between the active IOM 1 and the passive IOM 2 may be reduced, and the time required for completing a task of data synchronization may thereby be reduced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of data synchronization to be implemented by a redundant server system, the redundant server system including an active input/output module (IOM) and a passive IOM, the active IOM including a primary processing unit and a plurality of primary dedicated sensors that are electrically connected to each other, the primary processing unit including a primary memory device, the passive IOM including a secondary processing unit and a plurality of secondary dedicated sensors that are electrically connected to each other, the secondary processing unit being electrically connected to the primary processing unit of the active IOM, and including a secondary memory device, the primary memory device storing primary state data that include data detected by all of the primary dedicated sensors and the secondary dedicated sensors, the secondary memory device storing secondary state data that include data detected by all of the primary dedicated sensors and the secondary dedicated sensors, the method comprising steps of:

allocating, by the primary processing unit, a primary transfer buffer in the primary memory device;

allocating, by the secondary processing unit, a secondary transfer buffer in the secondary memory device, a memory layout of the secondary transfer buffer being identical to that of the primary transfer buffer;

by the secondary processing unit, collecting a plurality of pieces of secondary dedicated-sensor data that are numerical values detected by the secondary dedicated sensors, and storing the pieces of secondary dedicated-sensor data in the primary transfer buffer of the active IOM at once;

by the primary processing unit, collecting a plurality of pieces of primary dedicated-sensor data that are numerical values detected by the primary dedicated sensors;

after the pieces of primary dedicated-sensor data have been collected, by the primary processing unit, updating the primary state data based on the pieces of primary dedicated-sensor data thus collected and the pieces of secondary dedicated-sensor data stored in the primary transfer buffer at once, and storing the primary state data thus updated in the secondary transfer buffer of the passive IOM; and updating, by the secondary processing unit, the secondary state data based on the primary state data that have been updated and that are stored in the secondary transfer buffer.

2. The method as claimed in claim 1, wherein each of the primary memory device and the secondary memory device is a volatile memory and is electrically rewritable.

3. The method as claimed in claim 1, wherein the step of storing the pieces of secondary dedicated-sensor data in the primary transfer buffer is to package the pieces of secondary dedicated-sensor data into a single data packet, and to store the data packet in the primary transfer buffer.

4. The method as claimed in claim 1, the redundant server system further including a share bus, the active IOM further including a plurality of primary share sensors, the passive IOM further including a plurality of secondary share sensors, the primary processing unit, the primary share sensors, the secondary processing unit and the secondary share sensors being electrically connected to the share bus, the primary state data further including data detected by all of the primary share sensors and the secondary share sensors, the secondary state data further including data detected by all of the primary share sensors and the secondary share sensors, the method further comprising a step of:

by the primary processing unit, collecting a plurality of pieces of primary share-sensor data that are numerical values detected by the primary share sensors and a plurality of pieces of secondary share-sensor data that are numerical values detected by the secondary share sensors, wherein the step of updating the primary state data is to update, by the primary processing unit, the primary state data further based on the pieces of primary share-sensor data and the pieces of secondary share-sensor data thus collected.

5. The method as claimed in claim 1, the primary processing unit and the secondary processing unit being electrically connected to each other via an inter-integrated circuit ($I^2C$) bus, wherein:

the step of storing the pieces of secondary dedicated-sensor data in the primary transfer buffer is to store, by the secondary processing unit via the $I^2C$ bus, the pieces of secondary dedicated-sensor data in the primary transfer buffer at once; and the step of storing the primary state data thus updated in the secondary transfer buffer is to store, by the primary processing unit via the $I^2C$ bus, the primary state data in the secondary transfer buffer at once.

6. The method as claimed in claim 1, wherein:

the step of allocating a primary transfer buffer is to allocate, by the primary processing unit, the primary transfer buffer in a kernel driver layer of a Linux operating system; and the step of allocating a secondary transfer buffer is to allocate, by the secondary processing unit, the secondary transfer buffer in the kernel driver layer of the Linux operating system.

7. The method as claimed in claim 1, wherein the step of collecting a plurality of pieces of secondary dedicated-sensor data is to collect only the pieces of secondary dedicated-sensor data, and not to collect the pieces of primary dedicated-sensor data.

8. A redundant server system, comprising:

an active input/output module (IOM) including a primary processing unit that includes a primary memory device, and a plurality of primary dedicated sensors that are electrically connected to said primary processing unit; and a passive IOM including a secondary processing unit that is electrically connected to the primary processing unit of said active IOM, and that includes a secondary memory device, and, a plurality of secondary dedicated sensors that are electrically connected to said secondary processing unit, wherein said primary memory device is configured to store primary state data that include data detected by all of said primary dedicated sensors and said secondary dedicated sensors, wherein said secondary memory device is configured to store secondary state data that include data detected by all of said primary dedicated sensors and said secondary dedicated sensors, wherein said primary processing unit is configured to allocate a primary transfer buffer in said primary memory device, wherein said secondary processing unit is configured to allocate a secondary transfer buffer in said secondary memory device, a memory layout of the secondary transfer buffer being identical to that of the primary transfer buffer, wherein said secondary processing unit is configured to collect a plurality of pieces of secondary dedicated-sensor data that are numerical values detected by said secondary dedicated sensors, and to store the pieces of secondary dedicated-sensor data in the primary transfer buffer of said active IOM at once, wherein said primary processing unit is configured to
collect a plurality of pieces of primary dedicated-sensor data that are numerical values detected by said primary dedicated sensors, after the pieces of primary dedicated-sensor data have been collected, update the primary state data based on the pieces of primary dedicated-sensor data thus collected and the pieces of secondary dedicated-sensor data stored in the primary transfer buffer at once, and store the primary state data thus updated in the secondary transfer buffer of said passive IOM, and wherein said secondary processing unit is configured to update the secondary state data based on the primary state data that have been updated and that is stored in the secondary transfer buffer.

9. The redundant server system as claimed in claim 8, wherein each of said primary memory device and said secondary memory device is a volatile memory and is electrically rewritable.

10. The redundant server system as claimed in claim 8, wherein said secondary processing unit is configured to package the pieces of secondary dedicated-sensor data into a single data packet, and to store the data packet in the primary transfer buffer.

11. The redundant server system as claimed in claim 8, further comprising a share bus, wherein:
said active IOM further including a plurality of primary share sensors;
said passive IOM further including a plurality of secondary share sensors;
said primary processing unit, said primary share sensors, said secondary processing unit and said secondary share sensors are electrically connected to said share bus;

the primary state data further includes data detected by all of said primary share sensors and said secondary share sensors;
the secondary state data further includes data detected by all of said primary share sensors and said secondary share sensors;
said primary processing unit is further configured to collect a plurality of pieces of primary share-sensor data that are numerical values detected by said primary share sensors and a plurality of pieces of secondary share-sensor data that are numerical values detected by said secondary share sensors; and
said primary processing unit is configured to update the primary state data further based on the pieces of primary share-sensor data and the pieces of secondary share-sensor data thus collected.

12. The redundant server system as claimed in claim 8, wherein:
said primary processing unit and said secondary processing unit are electrically connected to each other via an inter-integrated circuit ($I^2C$) bus;
said secondary processing unit is configured to store, via the $I^2C$ bus, the pieces of secondary dedicated-sensor data in the primary transfer buffer at once; and
said primary processing unit is configured to store, via the $I^2C$ bus, the primary state data in the secondary transfer buffer at once.

13. The redundant server system as claimed in claim 8, wherein:
said primary processing unit is configured to allocate the primary transfer buffer in a kernel driver layer of a Linux operating system; and
said secondary processing unit is configured to allocate the secondary transfer buffer in the kernel driver layer of the Linux operating system.

14. The redundant server system as claimed in claim 8, wherein said secondary processing unit is configured to collect only the pieces of secondary dedicated-sensor data, and not to collect the pieces of primary dedicated-sensor data.

* * * * *